April 25, 1950  C. S. PERRY ET AL  2,505,003
CAR WHEELING DEVICE
Filed Nov. 15, 1945  3 Sheets-Sheet 1
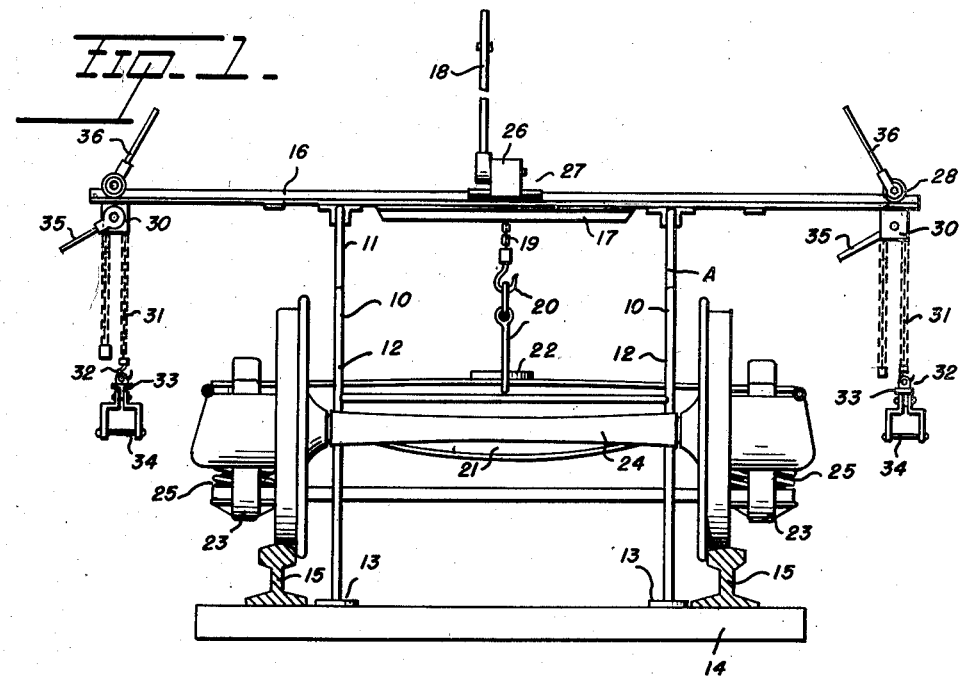
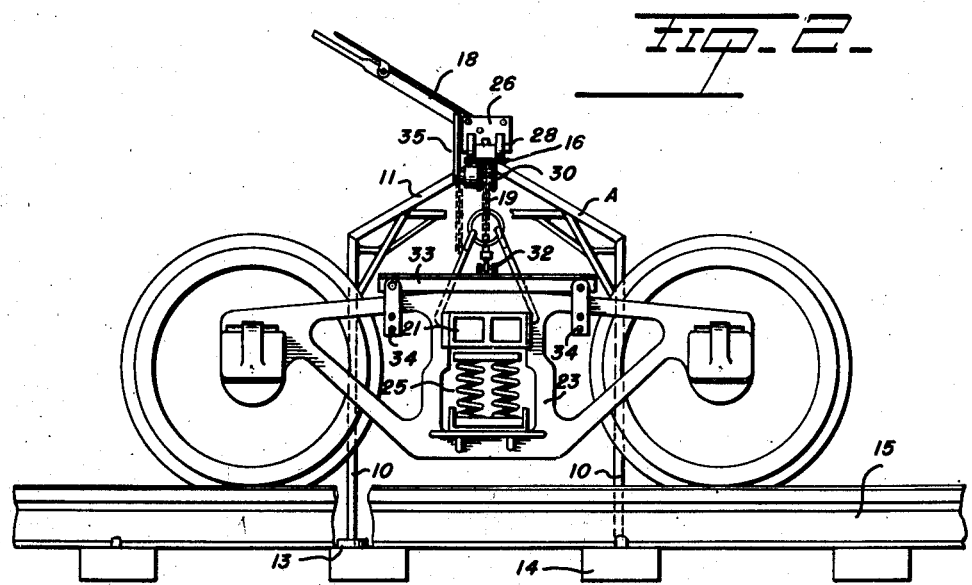
INVENTOR.
CHARLES S. PERRY - HOWARD M. MC·MILLAN
LUTHER C. HERRING - JOHN F. BAUKNIGHT
BY *Victor J. Evans & Co.*
ATTORNEYS

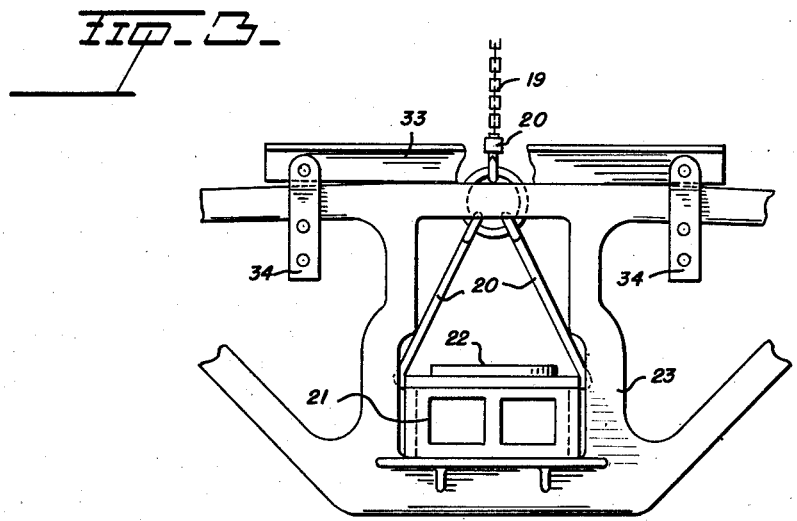
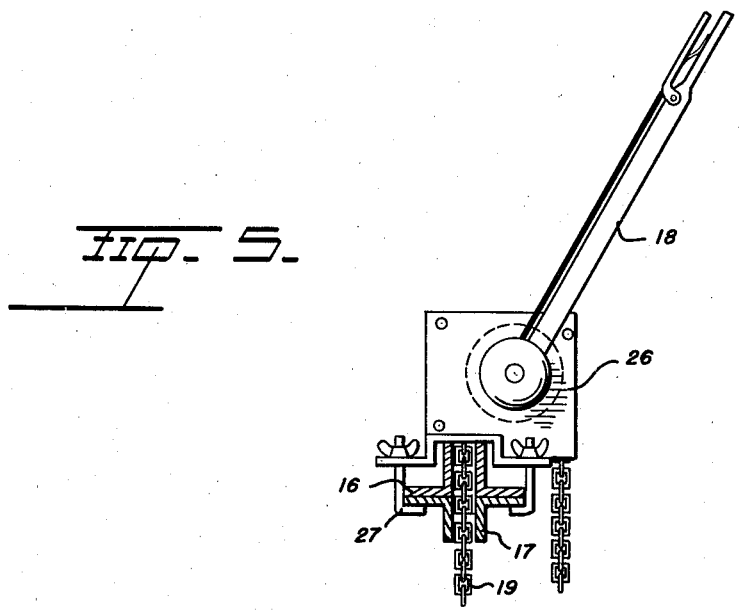
*INVENTOR.*
CHARLES S. PERRY - HOWARD M. MC·MILLAN
LUTHER C. HERRING - JOHN F. BAUKNIGHT
BY *Victor J. Evans & Co.*
ATTORNEYS April 25, 1950 C. S. PERRY ET AL 2,505,003
CAR WHEELING DEVICE
Filed Nov. 15, 1945 3 Sheets-Sheet 3
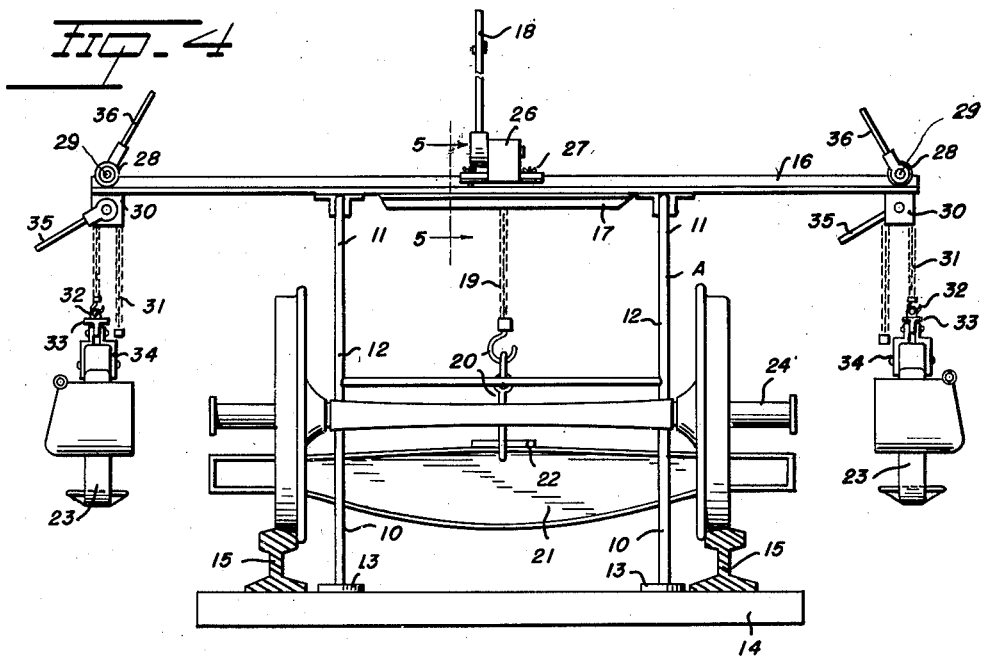
INVENTOR.
CHARLES S. PERRY - HOWARD M. MC·MILLAN
LUTHER C. HERRING - JOHN F. BAUKNIGHT
BY Victor J. Evans & Co.
ATTORNEYS Patented Apr. 25, 1950

2,505,003

UNITED STATES PATENT OFFICE 2,505,003

CAR WHEELING DEVICE

Charles S. Perry, Howard M. McMillan, Luther C. Herring, and John F. Bauknight, Atlanta, Ga.

Application November 15, 1945, Serial No. 628,686

1 Claim. (Cl. 212—13)

The invention relates to a car truck and wheel assembling apparatus, and more especially to a railway truck wheeling device.

The primary object of the invention is the provision of a device of this character, wherein the wheels with axles and bolster for a railway truck can be assembled within the latter with a minimum of manual labor and with dispatch, the device being of novel construction and is manually operated for the placement of the wheeled axles and the bolster properly within a railway car truck for assembly thereof.

Another object of the invention is the provision of a device of this character, wherein the bolster can be raised with respect to a railway car truck for the locating of the springs therebetween and the wheeling of such truck with the use of minimum labor and with dispatch, the device being unique in its assembly and the working thereof.

A further object of the invention is the provision of a device of this character which is simple in construction, thoroughly reliable and efficient in operation, strong, durable, portable for locating the same in a working position, conveniently operated, assuring safety in the use thereof, readily and easily adjusted, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 1 is an elevation of the device constructed in accordance with the invention in relation to a railway car truck when wheeled and assembled.

Figure 2 is a side view thereof, and positioned at right angles to that shown in Figure 1.

Figure 3 is a fragmentary side view of a side frame of the railway car truck with the bolster of the latter in position for the lifting thereof by the device.

Figure 4 is a view similar to Figure 1 showing a wheeled axle, side frames and bolster of a railway car truck in position for assembly of the latter by the device.

Figure 5 is a fragmentary sectional view taken on the line 5—5 (approximately) of Figure 4 looking in the direction of the arrows.

Figure 6 is a fragmentary enlarged side view of one of the side frame lifters of the device.

Figure 7 is a fragmentary end view of the structure shown in Figure 6.

Similar reference characters indicate corresponding parts throughout the several views in the drawings.

Referring to the drawings in detail, the device constituting the present invention, comprises a supporting stand A, involving upstanding spaced side sections 10, preferably made from tubing, and both having an upwardly arched bridge crowning 11, the leg portions 12 of the sections being formed with rest feet 13, adapted to contact the foundation or the cross ties 14 of a railway track, the portions of the rails thereof being indicated at 15.

Carried by the crowning 11 of the sections 10, midway thereof, are horizontally disposed spaced parallel substantially L-shaped guide rails or angles providing a beam 16 with underslung reinforcing rails or angles 17, correspondingly shaped and inverted to the angles 16, these angles 17 being extended a major portion of the space between the sections 10 and are joined with the said rails 16 in any desirable manner, while the rails 16 are detachably coupled to the sections 10 in any suitable manner. The rails 16 extend a considerable distance beyond the vertical lay of the sections 10 to the opposite sides of the stand A, as clearly appears in Figures 1 and 4 of the drawings.

Superposed on the rails 16 medially thereof is a chain tackle and block, the latter having journalled therein a chain feed sprocket, not shown, and operated by ratchet action by a hand actuated lever 18, and about this sprocket is trained the feed chain 19, which has detachably attached thereto grapple hooks 20, these being designed for engaging a bolster 21 at the center bearing 22 thereof for the raising and lowering of the said bolster in the placement or removal to and from a railway car truck, which involves the said bolster, the side frames 23, wheeled axles, one being denoted at 24, the cushioning springs 25, and adjuncts, not shown.

The block 26 for the chain tackle is detachably clamped in place by anchoring clamps 27 onto the rails 16 and 17, as best seen in Figure 5 of the drawings, and this block can be shifted to selected positions by release of the said clamps 27, as should be obvious.

On the outer end portions of the rails 16 are mounted lifter carriages, each including traction rollers 28, movable on the rails 16 and suspending from their axle 29 a supporting plate 29' carrying a hoisting chain block 30, having the hoister chain 31 thereof trained over a feed sprocket housed thereby, and this chain is coupled at 32 to a hanger beam or bar 33 midway of the same, the latter near opposite ends being fitted with attaching clips 34 for the holding of the side frames 23 suspended thereby, so that these frames can be placed and removed in the assembly of the truck or disassembly therefrom, as will appear from Figures 1 and 4 of the drawings. In this way the wheeled axles 24 can be assembled and disassembled with relation to the frames 23 and the bolster 21 assembled and disassembled with relation to such frames 23. Also the springs 25 can be properly located and removed with ease and dispatch in the wheeling of the car truck.

The sprocket for the chain 31 is ratchet operated by a hand actuated lever 35, and likewise, the rollers are driven through ratchet action from a hand lever 36, thus the hoisting chain block 30 can be adjusted on the rail 16 either inwardly or outwardly thereof for bringing the side frames 23 in assembling relation to the wheeled axles or disassembling relation thereto, as should be clearly obvious.

The device constituting the present invention is set up between the track rails 15 and the hoisting of the bolster and side frames, respectively, can be carried forth with ease and dispatch, this also being true for the lowering thereof. Also, the springs 25 can be placed and removed with ease and dispatch, and without excessive manual labor.

What is claimed is:

In a railway car wheel truck crane, the combination which comprises a pair of horizontally disposed spaced angle bars providing a supporting beam, said angle bars mounted with the vertical legs thereof positioned back to back and with the horizontal legs thereof extended outwardly, vertically disposed support frames on which the said supported beam is secured, said support frames being spaced apart a distance slightly less than the distance between the rails of a track on which the car is positioned and with the ends of the angles of the beam extended between said frames, the intermediate portion of said beam reinforced by angle bars on the under surface of the angles thereof, carriages including chain hoist blocks positioned below said extending ends of the beam, a supporting plate for each carriage on which the said chain hoist blocks are carried extended upwardly between the vertical legs of the angle bars of the beam, supporting wheels positioned to travel on the horizontally disposed legs of the angle bars, a shaft extended through each of the supporting plates and on the ends of which the said wheels are mounted, a ratchet lever carried by each of the shafts for rotating the said wheels to adjust the positions of the chain hoist blocks longitudinally on the ends of the beam, said chain hoist blocks having chains depending therefrom, a centrally disposed transversely positioned chain hoist block having a hook suspended by a chain therefrom with a ratchet operated hand lever for manually actuating the chain and hook, an anchor clamp supporting said centrally disposed chain hoist block adjustably on the intermediate portion of the beam with the chain hoist block extended at one side of the beam.

CHARLES S. PERRY.
HOWARD M. McMILLAN.
LUTHER C. HERRING.
JOHN F. BAUKNIGHT.

REFERENCES CITED

The following references are of record in the file of this patent:

UNITED STATES PATENTS

| Number | Name | Date |
| --- | --- | --- |
| 560,145 | McGehee | May 12, 1896 |
| 1,007,663 | Atterbury | Nov. 7, 1911 |
| 1,952,238 | Dice | Mar. 27, 1934 |
| 2,034,920 | Palermo | Mar. 24, 1936 |
| 2,208,491 | Bailey | July 16, 1940 |
| 2,410,979 | Kirton | Nov. 12, 1946 |